Nov. 15, 1955 S. A. SCHERBATSKOY 2,724,060
RADIATION DETECTOR
Filed Sept. 5, 1951 3 Sheets-Sheet 1
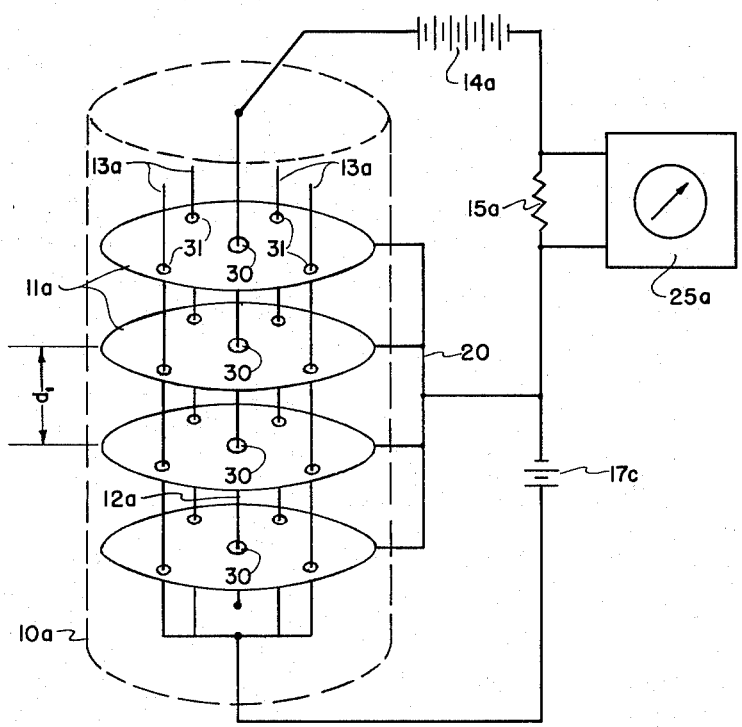
FIG. I
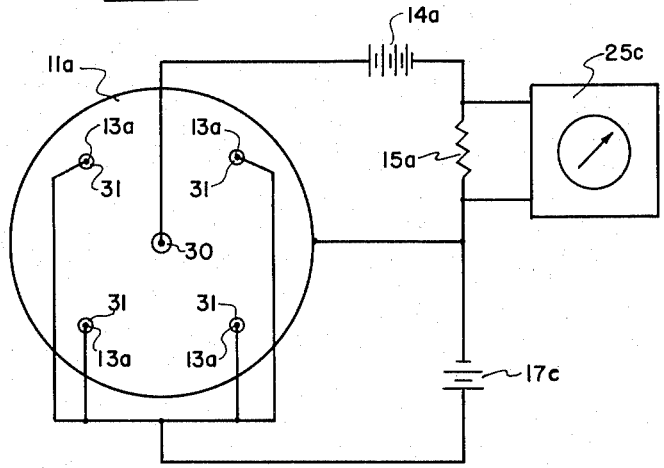
FIG. Ia
INVENTOR.
Serge A Scherbatskoy Nov. 15, 1955 S. A. SCHERBATSKOY 2,724,060
RADIATION DETECTOR
Filed Sept. 5, 1951 3 Sheets-Sheet 3

INVENTOR.
Sage A Scherbatskoy

United States Patent Office 2,724,060
Patented Nov. 15, 1955

2,724,060
RADIATION DETECTOR

Serge A. Scherbatskoy, Tulsa, Okla.

Application September 5, 1951, Serial No. 245,180

6 Claims. (Cl. 250—83.6)

This invention relates to the detecting and measurement of radiation, and more particularly to a device of the Geiger counter type for measuring the intensity of such radiation as gamma rays.

An important object of this invention is to provide a measuring device of much higher efficiency than the conventional counter. Another object is to provide such a device which will be sufficiently rugged to be used in comparatively rough service such as in logging of wells and bore holes.

The conventional radiation detectors often consist of a thin-walled tubular metallic cathode and of an elongated thin wire-anode coinciding with the axis of the cathode tube. The anode and the cathode are enclosed in an envelope containing a suitable gaseous medium at a determined pressure. The detection of gamma rays by means of such an instrument is based upon an indirect process involving extraction of ionizing electrons. That is, the detector is not appreciably directly responsive to the passage of gamma rays, but is made to be responsive if gamma rays liberate ionizing electrons through the interaction with the cylindrical wall of the detector. The liberated electrons are drawn to the positive anode-wire colliding with the gas molecules in its path and thus liberating further electrons.

The ideal radiation counter is one which signals the passage of all photons by producing pulses of the shortest possible duration, the number of pulses being equal to the number of photons. The actual counter has, however, a low efficiency because only a small fraction of incoming photons releases the impulse producing electrons. The purpose of this invention consists therefore in increasing the efficiency of radiation counters by increasing the probability of interaction of photons or other radiation particles with matter.

Other objects and advantages of this invention will be apparent from the description which follows when taken with the drawings, in which:

Fig. 1 and Fig. 1a show, respectively, a perspective and a horizontal cross section of a radiation counter of parallel plate type embodying the principles of my invention.

Figure 2:
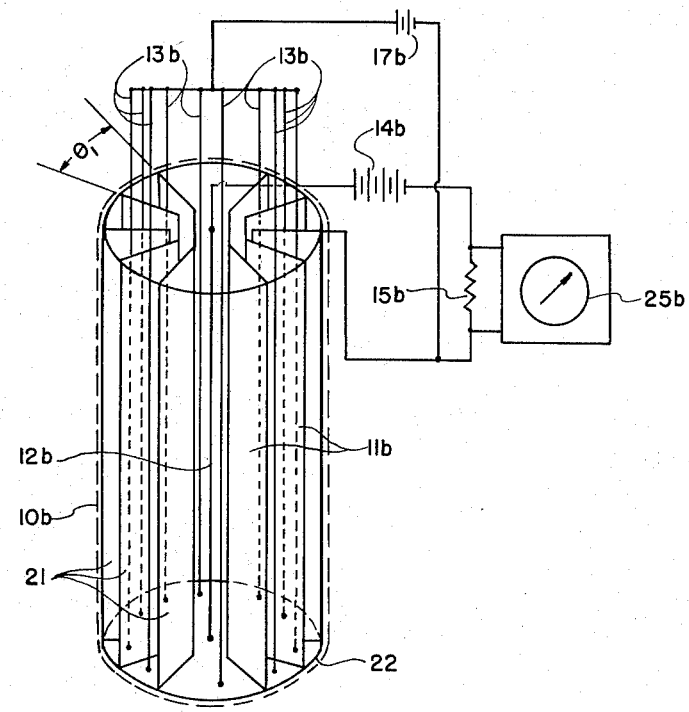
Fig. 2 and Fig. 2a show, respectively, a perspective and a horizontal cross section of a radiation counter of star type embodying the principles of my invention.
Figure 2A:
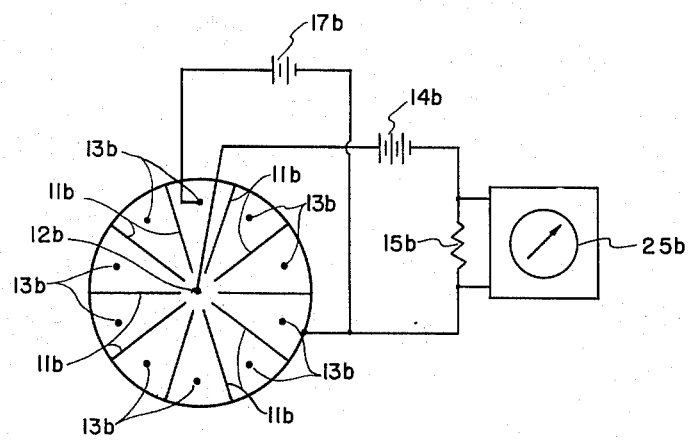

Consider now the parallel plate counter of Fig. 1 and Fig. 1a and the star counter of Fig. 2 and Fig. 2a. These counters contain certain elements that are similar and present in both of them. These similar elements that are contained in the parallel plate counter shall be designated by a numeral having a subscript "a." Those present in the star counter shall be designated by a numeral having a subscript "b."

The counters shown in Figs. 1, 1a, and Figs. 2, 2a incorporate as their essential elements gas filled housings 10a and 10b containing cathode structures 11a, 11b, and a wire anode 12a, 12b, and a plurality of auxiliary wires 13a, 13b, respectively. A suitable gas content consists of nine parts argon and one part xylol at a pressure range between one to sixteen centimeters of mercury. The anodes 12a, 12b are connected to the positive terminals of the batteries 14a, 14b, respectively, through resistors 15a, 15b, respectively, and the cathodes 11a, 11b are connected to the negative terminal of said batteries. The potential provided by each of the batteries 14a, 14b is 1250 volts. The auxiliary wires 13a, 13b are maintained with respect to the cathodes 11a, 11b, respectively, at a potential of 700 volts by means of the batteries 17a, 17b, respectively.

The cathode structure of the parallel plate counter shown in Figs. 1, 1a consists of a plurality of plates 11a positioned one underneath the other. Each of these plates is provided with a central perforation 30 for the passage of the anode wire and with four peripheral perforations 31 for the passage of the auxiliary wires 13a.

The cathode structure of the star counter shown in Figs. 2, 2a consists of a plurality of metallic plates 11b disposed along the radial planes symmetrically with respect to its axis. The plates have their outer edges set into metallic rings 22 which provide electrical connections therebetween. The auxiliary wires 13b are stretched parallel to the axis and equidistantly from the neighboring plates.

The potential applied between the anode wire and the cathode structure either of the type shown in Figs. 1, 1a or Figs. 2, 2a is derived from the sources 14a, 14b and is approximately the threshold potential so as to initiate a discharge in the tube in response to the passage of an ionizing electron through the space between the cathode and the anode. As is well understood in the art, the potential is not high enough to initiate a discharge in the absence of an ionizing electron. Each ionizing electron is usually extracted from the cathode of the counter by an incoming photon and causes a discharge impulse by a resultant avalanche of ions, that is, a large quantity of electricity flows for a short time in the counter circuit. This current causes a large voltage drop across the resistors 15a, 15b and the discharge will cease after a very short period of time. The frequency of these current impulses can be rendered perceptible if sensitive frequency measuring instruments 25a, 25b are connected across the terminals of the resistors 15a, 15b, respectively, which instruments indicate the intensity of incoming radiation by a needle deflection.

The probability of gamma ray photons causing ionization in the gas is very small because not every photon extracts an ionizing electron from the surface of the counter and a great many of them traverse the counter without producing any measurable effect. The ionization effectiveness of gamma radiation may be increased, however, by enlarging the effective surface exposed to radiation. Thus a larger number of electrons is extracted, and a larger number of counts is obtained as a measure of the incoming radiation.

The efficiency E of a gamma ray counter is defined as the ratio of the observed counts $N_0$ to the number of gamma ray photons $n$ which pass through the counter during this time, i. e.

$$E = \frac{N_0}{n}$$

It is apparent that in order to provide an efficient parallel plate counter, it is desirable to have a relatively large number of plates, i. e. to have the distance between two adjacent plates relatively small. I have found, however, that one cannot decrease the distance between the plates indefinitely. When this distance reaches a certain optimum value the efficiency of the counter is maximum, but when the distance is made to decrease below said optimum valve, the efficiency of the counter decreases.

It has been determined that this decrease in efficiency is due to the fact that the field from anode wire $12a$ does not penetrate into the deep crevices between the parallel plates. It is apparent that some of the electrons ejected from the surfaces $11a$ traverse these crevices and leave ionization tracks that are contained in these crevices. These ionization tracks are not subjected, however, to any external electrical field since said field does not penetrate into the crevices, and are therefore totally ineffective in producing any counter discharges. I have determined, however, that these electrons can be extracted from the crevices by the placement of auxiliary wires such as $13a$ maintained at a moderate positive potential by means of the battery $17c$. The electrostatic potential produced by these auxiliary wires accelerates the electrons and causes them to be withdrawn from the crevices and to move in the direction of the anode wire $12a$.

The increase in efficiency of the counter caused by the insertion of the auxiliary wires $13a$ can be shown as follows: Let us define the factor $K$ as being the ratio of the efficiency of a parallel plate type counter as compared to that of an ordinary counter of the cylindrical type having the same external dimensions. Then it is possible to express variations in efficiency as a function of various internal configurations of the cathode. In the counter of the parallel plate type the efficiency is a function of the spacing between the plates.

Figure 3:
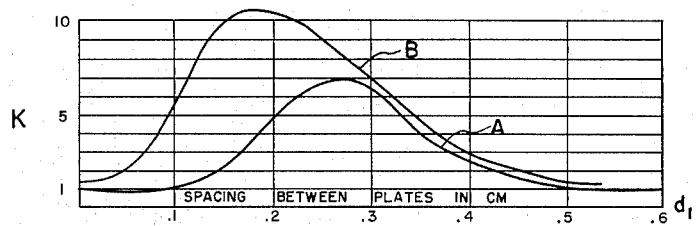
Fig. 3 shows graphically a relationship between the efficiency of the parallel plate counter and the linear spacing of the plates forming its anode.

Fig. 3 shows two graphs designated as A and B representing the above relationships experimentally. The abscissas in Fig. 3 represent various values of spacings $d_1$ between plates (expressed in cm.) and ordinates show the corresponding values of K. The graph A corresponds to a conventional parallel plate counter without any auxiliary wires (as is the one described in the U. S. Patent, 2,398,934 issued to D. C. G. Hare). The graph B corresponds to a novel counter provided with the auxiliary wires $13a$ as shown in Figs. 1, $1a$. It is seen from the graph A that for a standard plate counter the optimum spacing $d_1 = .27$ cm. and the efficiency of this spacing corresponds to $K=7$. On the other hand, it is seen from the graph B that for the counter with auxiliary wires the maximum efficiency $K=11$ and corresponds to an optimum spacing of .17 cm. It is thus apparent that the inclusion of the auxiliary wires maintained at a slightly positive potential increased the efficiency of the counter from $K=7$ to $K=11$. Furthermore, an important feature of this invention consists in permitting the reduction of the optimum distance from $d_1 = .27$ cm. to $d'_1 = .17$ cm.

Consider now the counter in which the plates, instead of being perpendicular to the axis are arranged radially as shown in Figs. 2, $2a$ and let $\theta_1$ designate the angle expressed in degrees between the two neighboring radial plates $11b$. It is apparent that if $n$ designates the total number of the plates $11b$, then $n\theta = 360°$. In order to provide an efficient counter it is of course desirable to have many plates, i. e. to let $\theta$ be relatively small. I have found, however, that there is a minimum value of $\theta$ corresponding to the maximum efficiency of the counter. If the value $\theta$ is made to decrease below said minimum value, the efficiency of the counter decreases. This is due to the fact that the field created by the anode cathode potential does not penetrate sufficiently into the deep crevices found by two adacent plates and we obtain "dead spaces" similar to the ones mentioned hereinabove. These "dead spaces" are eliminated by means of auxiliary wires $13b$ that are maintained at slightly positive voltage with respect to the plates by means of the battery $17b$. In such a manner we obtain an auxiliary field in the crevices which allows the extraction of the electrons from the ionization tracts that are contained in the "dead spaces."

Figure 4:
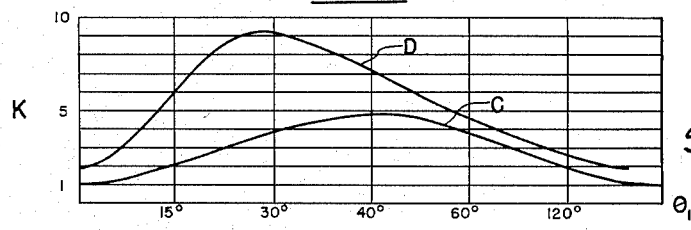
Fig. 4 shows graphically a relationship between the efficiency of a star counter and the angular spacing of the plates forming its anode.

Fig. 4 shows two graphs designated as C and D representing the above relationships experimentally. The abscissas in Fig. 4 represent the angle $\theta$ expressed in degrees between two neighboring plates and the ordinates represent the corresponding values of K. The graph C corresponds to a star counter without auxiliary grids and the graph D corresponds to a star counter with auxiliary grids. It is seen from the graph C that the optimum angular spacing for a standard counter is 40° and the efficiency at this spacing corresponds to $K=5$. It is apparent, however, from the graph D that by means of the auxiliary wires we are able to reduce the optimum angular spacing to a value of 25° and correspondingly increase the efficiency to a value of $K=9$.

Figures 5, 6:
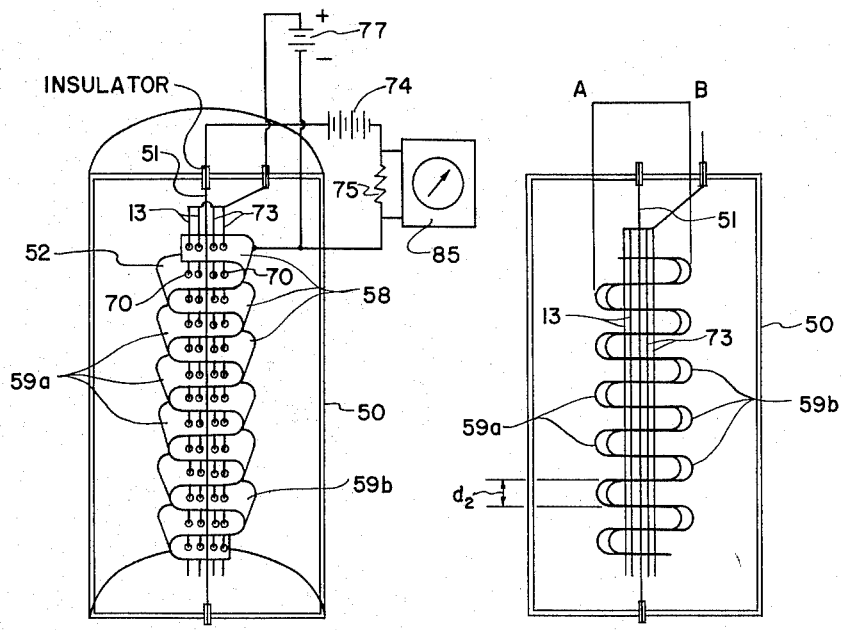
Fig. 5 shows in perspective some of the elements of the counter comprising undulating ribbons and embodying the principles of the present invention.
Figs. 6 and 7 show, respectively, a horizontal and a vertical cross sectional view of the counter shown in Fig. 5.
Figure 7:
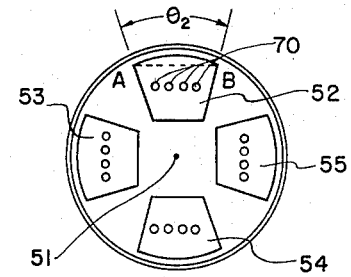

Consider now Figs. 5, 6, and 7 illustrating a third embodiment of my invention that combines the features of the parallel plate and star counter, and also includes auxiliary grids that make it possible to obtain an efficiency exceeding considerably those in previous counters.

Fig. 5 shows in perspective the structural arrangement of one of the electrodes and Fig. 6 and Fig. 7 give a more complete representation of various structural details in longitudinal and horizontal cross section, respectively.

The counter shown therein comprises a cylindrical housing 50 which contains a suitable gas such as, for instance, nine parts argon and one part xylol at a pressure between one and 16 cm. of mercury. Coaxially with the housing is stretched a fine insulated wire 51 which serves as the anode. The cathode structure consists of four separate and identical units arranged symmetrically with respect to the central wire and designated by numerals 52, 53, 54, and 55, respectively. Each of these units has an undulated or zigzag-like structure, the undulations of which are extending in the direction parallel to the axis of the wire. One of these structures designated by 52 is shown in perspective in Fig. 5. The structure 52 consists essentially of parallel equidistance plates 58 arranged transversely with respect to the wire and connected one to another in sequence and on alternate sides by vertical plates $59a$ and $59b$ so as to form a single zigzag-like structure. The plates 58 are in form of circular segments separated one from another by a distance $d_2$. Each of these segments subtends an angle $\theta_2$. All the vertical plates $59a$ and all the vertical plates $59b$ are respectively contained in two radial planes passing through the wire 51 and forming an angle $\theta_2$ therebetween. The distance $d_2$ shall be also designated as the width of the undulation whereas the amplitude of the undulation shall be designated by segment AB and shall represent the maximum length of each of the horizontal plates 52. Each of the ribbons has its plane of symmetry passing through the axis of the wire 51 and the undulations are such that their width $d_2$ is small when compared to their amplitude AB. Such a structure is very easy to manufacture and is readily adapted to press die forming fabrication. Each of the undulated ribbons is provided with four perforations 70 for the passage of four auxiliary wires 73. The auxiliary wires are maintained at a potential of 800 volts with respect to the ribbon 52 by means of the battery 77. The main field between the ribbons and the anode wire is provided by the battery 74 generating a potential of 1250 volts.

If we now compare the counter of Fig. 5, Fig. 6, Fig. 7 with the counters of Figs. 1, $1a$ and Figs. 2, $2a$ we can readily see that the anode structure comprising all the four undulated units 52, 53, 54, 55 and the auxiliary wires can be considered as a combination of all the elements present both in a parallel plate type and in a star type counter. In particular, all the horizontal plate segments of the units 52, 53, 54, 55 are located in planes perpendicular to the wire 51 and have surfaces approximately equal to the corresponding surfaces of the circular plates of Fig. 1.

Similarly, the vertical plates that are located in a single radial plane such as 59a or such as 59b have a total surface equal to the half of the surface of a corresponding radial plate in Figs. 2, 2a.

The novel characteristic of my counter consists in the provision of the auxiliary wires 73 maintained at a relatively small positive potential with respect to the undulated ribbon by means of the battery 77. The auxiliary field created by this potential penetrates into the crevices and thus eliminates any "dead space." An important design feature is based upon the proper selection of the value $d_2$ and the value $\theta_2$. The value $d_2$ has been determined from the graph B in Fig. 3 and corresponds to the maximum efficiency of the counter with horizontal plates as shown in Fig. 1, i. e., $d_2=d'_1=.17$ cm. The value $\theta_2$ has been determined from the graph D of Fig. 4 and corresponds to the maximum efficiency of the counter with vertical plates as shown in Figs. 2, 2a, i. e. $\theta_2=\theta_1=25°$. It is thus apparent that I have combined the advantages obtained from the arrangement of Fig. 3 and Fig. 4. The maximum advantage that can be obtained with the arrangement of Fig. 4 is a K of about 11 and the maximum advantage that can be obtained with the arrangement of Fig. 2 is a K of about 9. By the employment of the principles of my invention it is possible to realize factors corresponding to a K of 15–20.

If we compare again the geometry of the cathode structure as shown in Figs. 6 and 7 with the cathode structures of the parallel plate counter of Figs. 1, 1a and star counter of Figs. 2, 2a, it becomes apparent that the total surface of the circular segments such as 53 is equal to the total surface of circular plates 19 in Fig. 1. Furthermore, the total surface of the rectangular plates such as 59a, 59b is equal to the half of the total surface of the radial plate 21 in Figs. 2, 2a. Consequently, the total effective cathode surface of the counter designed in accordance with my invention is equal to the total effective surface of the parallel plate counter at maximum efficiency plus the half of the total effective surface of the star counter at its maximum efficiency.

I claim:

1. A radiation detecting device comprising a wire electrode, a plurality of undulated ribbons, connected electrically one to another to form the other electrode, each of said ribbons having its undulations in the direction parallel to the axis of said wire electrode and arranged in separate relation symmetrically with respect to said wire electrode, said ribbons being exposed to impinging radiation and emitting electrons as a result of the interaction with said radiation, an ionizable medium comprising said wire electrode and said ribbons, means for applying a difference of potential of determined magnitude between said wire electrode and said ribbons, thereby producing an electric field in said medium for collecting the products of ionization caused by said electrons when traversing said medium, the distribution of the intensity of said field being dependent upon the extent of said undulations and such that at some portions of said medium within said undulations, the field becomes too weak to be effective in collecting said ionization products in said portions, a plurality of auxiliary wire electrodes comprised in said medium and traversing said portions, and a second means for applying another difference of potential of a different magnitude between said auxiliary wire electrode and said undulated ribbons, thereby producing an auxiliary electric field in said portions, said auxiliary field being effective in collecting said ionization products in said portions.

2. A radiation detecting device comprising a wire electrode, a plurality of undulated ribbons connected electrically and disposed in separate relation symmetrically with respect to said wire electrode, each of said undulated ribbons consisting of a plurality of parallel plate segments arranged one above the other substantially transversally to said wire electrode and a plurality of connecting plate segments substantially parallel to said wire electrode, said connecting segments interposed between said plate segments to form the undulations, said undulated ribbons being exposed to impinging radiation and emitting electrons as a result of the interaction with said radiation, an ionizable medium comprising said wire element and said undulated ribbons, means for applying a difference of potential of a relatively large magnitude between said wire element and said undulated ribbons, thereby producing an electric field in said medium for collecting the products of ionization caused by said electrons when traversing said medium, the distribution of the intensity of said field being dependent upon the shape of said undulations and such that at some portions of said medium within said undulations the field becomes too weak to be effective in collecting said ionization products in said portions, a plurality of auxiliary wire electrodes comprised in said medium and traversing said portions, and a second means for applying another difference of potential of a relatively small magnitude between said auxiliary wire electrodes and said undulated ribbons, thereby producing an auxiliary electric field in said portions, said auxiliary field being effective in collecting said ionization products in said portions.

3. A radiation detecting device comprising a wire anode, an undulated ribbon electrode in the neighborhood of said wire anode, said undulated ribbon electrode consisting of a plurality of parallel plate segments arranged one above the other substantially transversally to said wire anode and a plurality of connecting plate segments substantially parallel to said wire anode, said connecting segments interposed between said plate segments to form the undulations, said parallel plate segments being provided with holes arranged in a plurality of parallel lines, an auxiliary wire electrode extending through each line of holes, said wire electrodes being connected together electrically, a source of voltage for applying relatively large difference of potential between said wire anode and said ribbon electrode, and another source of voltage for applying a relatively small difference of potential between said auxiliary wire electrodes and said ribbon electrode.

4. A radiation detecting device comprising a wire anode, another electrode comprising a plurality of undulated ribbons connected electrically and disposed in separate relation symmetrically with respect to said wire anode, each of said ribbons being undulated in a direction parallel to said wire anode and being provided with at least one series of holes aligned along the direction parallel to said wire anode, an auxiliary wire electrode extending through said series of holes, a source of relatively large voltage connected to said wire anode and said other electrodes and a source of relatively small voltage connected to said auxiliary wire and said other electrode.

5. A radiation detecting device comprising a wire anode, another electrode comprising a plurality of undulated ribbons connected electrically and disposed in separate relation symmetrically with respect to said wire anode, the direction of the undulations of each of said ribbons being parallel to the axis of said wire anode and said undulations being symmetrical with respect to a plane passing through said axis, whereby the planes of symmetry of each of said ribbons are radially disposed with respect to said axis, each of said undulated ribbons comprising a plurality of series of aligned holes, and an auxiliary wire electrode extending through each of said holes, said auxiliary wire electrodes being connected together electrically, a source of relatively large voltage connected to said wire anode and said other electrode, and a source of relatively small voltage connected to said auxiliary electrodes and said other electrode.

6. A radiation detecting device comprising a wire electrode, a plurality of undulated ribbons, connected electrically one to another to form the other electrode, each of said ribbons being contained in the space between two radial places passing through the axis of said wire and having its undulations in the direction parallel to the axis of said wire, said ribbons being arranged in separate relation symmetrically with respect to said wire electrode, and being provided with plurality of openings disposed in aligned groups and an auxiliary wire electrode extending through the center of each group of openings.

References Cited in the file of this patent
UNITED STATES PATENTS

| | | |
|---|---|---|
| 2,425,533 | Herzog | Aug. 12, 1947 |
| 2,469,460 | Fearon | May 10, 1949 |
| 2,480,808 | Fearon | Aug. 30, 1949 |
| 2,499,489 | Goldstein et al. | Mar. 7, 1950 |
| 2,519,007 | Wilson | Aug. 15, 1950 |
| 2,648,781 | Herzog et al. | Aug. 11, 1953 |